No. 689,425. Patented Dec. 24, 1901.
H. SHAW.
KNIFE CLEANING MACHINE.
(Application filed July 10, 1901.)
(No Model.)
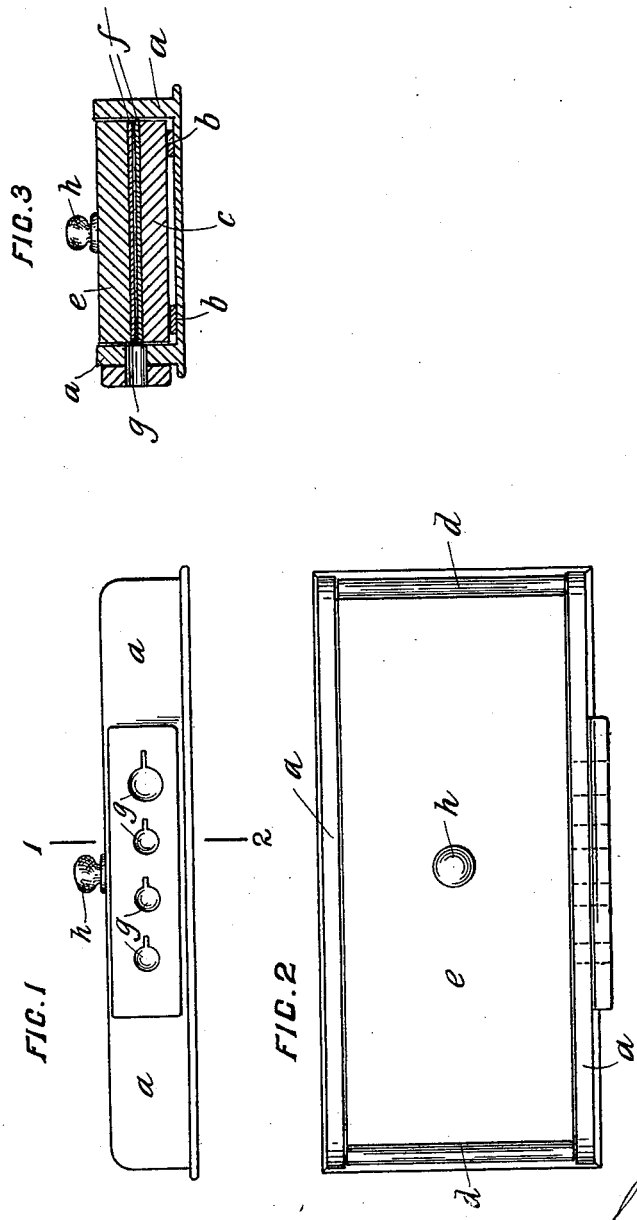
WITNESSES:
Isabella Waldron
Barbara Cambeis
INVENTOR.
Harry Shaw
BY
Richard
ATTORNEYS.

UNITED STATES PATENT OFFICE.

HARRY SHAW, OF WELLINGTON, NEW ZEALAND.

KNIFE-CLEANING MACHINE.

SPECIFICATION forming part of Letters Patent No. 689,425, dated December 24, 1901.

Application filed July 10, 1901. Serial No. 67,789. (No model.)

*To all whom it may concern:*

Be it known that I, HARRY SHAW, a subject of the King of Great Britain, residing at Wellington, in the Colony of New Zealand, have invented a new and useful Improvement in Knife-Cleaning Machines; and I do hereby declare the following to be a full, clear, and exact description of the same.

This invention consists of an oblong endless box, the top side of which is open. Longitudinally along the bottom of the box are laid strips of wood. Fitting within the box is a flat board that will slide freely upon the strips. This board is provided on each end with upwardly-projecting stops and between the stops fits a similar board. The adjacent surfaces of the two boards are covered with buff-leather, felt, or any other similar material. The side of the box in a line with the space between the two boards fitting within it is pierced with a number of holes and slits for the insertion therein of the knives to be cleaned.

In the accompanying drawings, Figure 1 is a side elevation of the machine. Fig. 2 is a plan of the same. Fig. 3 is a cross-section taken on the line 1 2 of Fig. 1.

$a$ is the endless box, along the bottom of which are laid the strips $b$, which serve as slides or runners. Fitting within the box is the board $c$, that rests upon the slides $b$, and the two ends of which are provided with upwardly-projecting stops $d$. A board $e$, similar in shape and size to the board $c$, rests upon it and fits between the stops $d$, so that both boards may be moved together. The adjacent surfaces of the boards $c$ and $e$ are covered with layers of felt $f$ or other suitable cleaning material.

The side of the box $a$ is pierced with a number of holes $g$, whose centers are placed in a line with the point of connection between the layers of felt $f$. The holes $g$ are also formed with a short longitudinal slit on one side, so that the blade of a knife may be passed through and the handle fit into the circular hole.

The top board $c$ has secured to it a handle $h$.

The knives to be cleaned are passed through the holes $g$ so that their blades shall enter between the felt layers $f$. A rapid reciprocatory motion is then imparted to the boards $c$ and $e$, which will slide up and down upon the slides $b$. The handles of the knives will be gripped within the holes $g$, so that they shall remain stationary, and the felt layers will therefore rub upon the sides of their blades and clean them.

If desired, a knife-polish or other suitable composition may be spread upon the felt to aid it in its work. The boards $c$ and $e$ may also, if desired, be removed from the box $a$, so that they may be used as ordinary knife-cleaning boards.

What I claim as my invention, and desire to secure by Letters Patent, is—

In knife-cleaners, in combination, an endless wooden box with orifices in the side thereof, longitudinal slats or runners in the bottom of the box, a lower board resting upon the said runners and having upwardly-projecting stop-pieces at each end, an upper board resting upon the lower board between the stop-pieces, polishing-surfaces upon the adjacent faces of the boards, and a handle on the top board, substantially as described.

In testimony whereof I have signed this specification in the presence of two subscribing witnesses.

HARRY SHAW.

Witnesses:
W. ALEXANDER,
JAS. T. HUNTER.